United States Patent
An

(10) Patent No.: US 7,688,026 B2
(45) Date of Patent: Mar. 30, 2010

(54) ENERGY STORAGE MOBILE CHARGING ADAPTER AND ENERGY STORING METHOD FOR THE SAME

(75) Inventor: Tai-Li An, ShenZhen (CN)

(73) Assignee: Shenzhen Meiouya Power Supply Technology Co., Ltd., Shenzhen (CN)

( * ) Notice: Subject to any disclaimer, the term of this patent is extended or adjusted under 35 U.S.C. 154(b) by 112 days.

(21) Appl. No.: 11/912,497

(22) PCT Filed: May 15, 2006

(86) PCT No.: PCT/CN2006/001014

§ 371 (c)(1),
(2), (4) Date: Oct. 24, 2007

(87) PCT Pub. No.: WO2006/125374

PCT Pub. Date: Nov. 30, 2006

(65) Prior Publication Data

US 2008/0174271 A1    Jul. 24, 2008

(51) Int. Cl.
    *H02J 7/02* (2006.01)
(52) U.S. Cl. .................. 320/111; 307/66; 320/114; 320/145

(58) Field of Classification Search .............. 320/111, 320/114, 115, 137, 138, 145; 307/66
See application file for complete search history.

(56) References Cited

U.S. PATENT DOCUMENTS 6,504,345 B2 *   1/2003   Sakurai et al. ............... 320/162
6,950,320 B2 *   9/2005   Shin ........................ 363/21.15

\* cited by examiner

*Primary Examiner*—Edward Tso
*Assistant Examiner*—Ramy Ramadan
(74) *Attorney, Agent, or Firm*—Banger Shia

(57) ABSTRACT

An energy storage mobile charging adapter is disclosed, in which the output terminal of an AC/DC isolated converter circuit board are connected with input terminals of a charging adapter circuit board, a commercial power plug is connected with the input terminals of the AC/DC isolated converter circuit board, characterized in that, a lithium chargeable battery is electrically connected with the output terminal of the AC/DC isolated converter circuit board and the input terminals of a charging adapter circuit board through a lithium battery protection circuit board, the charging adapter plug is electrically connected to the output terminals of the charging adapter circuit board, and all of the above components are sealed in a plastic housing.

4 Claims, 4 Drawing Sheets

ENERGY STORAGE MOBILE CHARGING ADAPTER AND ENERGY STORING METHOD FOR THE SAME

BACKGROUND OF THE INVENTION

1. Field of the Invention

The present invention relates to a battery charger, and more particularly to an energy storage mobile charging adapter and an energy storing method for the same.

2. Description of the Prior Art

Conventionally, a mobile phone is recharged by connecting a charging adapter to the commercial power, with the limitation of time, space and some other conditions. Thus, the mobile phone cannot be recharged during outside use and locomotion. The mobile phone battery is usually not recharged in time, so that the electric power will be exhausted halfway, thus, affecting information communication.

The present invention has arisen to mitigate and/or obviate the afore-described disadvantages.

SUMMARY OF THE INVENTION

The primary objective of the present invention is to provide an energy-storage movable charging adapter and an energy storing method for the same, so as to achieve the charger and storage functions of the charging adapter through the inner energy storage circuit.

In order to achieve the above objective, a charging adapter in accordance with the present invention comprises a plastic housing 7, an AC/DC isolated converter circuit board 3, a charging adapter circuit board 5. The output terminal of the AC/DC isolated-converter circuit board 3 is connected to the input terminal of the charging adapter circuit board 5. The commercial plug 1 is connected to the input terminal of the AC/DC isolated converter circuit board 3. This charging adapter is characterized in that: a lithium chargeable battery 2 is electrically connected to the output terminals of the AC/DC isolated converter circuit board 3 and the charging adapter circuit board 5 through a lithium battery protection circuit board 4, and a charging adapter jack 6 is electrically connected to the output terminal of the charging adapter circuit board 5.

The charging adapter in accordance with the present invention further comprises:

In the AC/DC isolated converter circuit board 3, the commercial AC current flows through safety resistors F1, and rectifier and filter 4D, C1 in two routes. In one route, the AC current flows through an isolating transformer B1 and a primary coil to the collector of a transistor Q2. In the other route, the AC current flows through resistor R1 to the base of Q2. The positive feedback coil L in B1 is connected to the base and the emitter of Q2 through a capacitor C3, a capacitor C2, a resistor R2 and a resistor R3. The induced current of the secondary coil of B1 is outputted through the rectifier and filter D3, C5.

In the lithium battery protection circuit board 4, the positive electrode and the negative electrode of the lithium chargeable battery 2 are connected to the testing terminal of IC1. The control terminal of IC1 is connected to the negative electrode of the lithium chargeable battery 2 through a switch circuit U2. The positive electrode of the lithium chargeable battery 2 is connected to the output positive electric terminal of the circuit board 3, and the negative electrode of the lithium chargeable battery 2 is connected to the negative terminal of the circuit board 3.

In the charging adapter circuit board 5, the PWM control terminal of an integrated circuit IC2 is connected to the gate of a field effect transistor Q3. The drain of the field effect transistor Q3 is connected to the output positive terminals of the circuit board 3 and the circuit board 4 through the coil L1 and is connected to the positive terminal of the charging adapter jack 6 through the rectifier diode D6, the coil L1 and the capacitor C7. The voltage testing terminal of IC2 is cross-connected to the charging adapter jack 6 through the resistors R8, R9 and capacitor C7. The current testing terminal of IC2 is connected to the negative terminal of the charging adapter jack 6 through the resistor R10. Or in the charging adapter circuit board 5, the PWM control terminal of the integrated circuit is connected to the gate of the field effect transistor Q3. The source of the field effect transistor Q3 is connected to the output positive terminals of the circuit board 3 and the circuit board 4. The drain of the field effect transistor Q3 is connected to the positive terminal of the charging adapter jack 6 through the coil L1 and the capacitor C7. The positive electrode of the rectifier diode D6 is connected to the coil L1 and the drain of the field effect diode Q3. The negative electrode of the rectifier D6 is connected to the negative terminal of the charging adapter jack 6. The voltage testing terminal of IC2 is cross-connected to the charging adapter jack 6 through the resistors R8, R19 and the capacitor C7. The current testing terminal of IC2 is connected to the negative terminal of the charging adapter jack 6 through the resistor R10.

An energy storing method for an energy-storage movable charging adapter in accordance with the present invention comprises the steps of: isolating and converting AC/DC; protecting lithium battery; and recharging and adapting.

Isolating and converting AC/DC: rectifying and filtering the commercial power into DC power, the positive electricity of the positive terminal of the DC power is supplied to a collector of a transistor Q2 through a primary coil of an isolating transformer, and is supplied to a base of Q2 through a resistor The current of the collector of Q2 is increased, and the current in the primary coil is exponentially increased. At the same time, the positive voltage induced by the positive feedback coil in the isolating transformer is supplied to the base of Q2 to conduct Q2 more quickly. The current flowing from the emitter of Q2 flows back to the negative terminal of the DC electricity. When the voltage drop caused by the current on the resistor R3 is greater than the base conduction voltage of the transistor Q1, the conduction of Q1 causes the decrease of the base electric potential of Q2 and the current in the collector and the primary coil, and the voltage turnover of both ends of the positive feedback coil, and further accelerate the cutoff of Q2. At this moment, the magnetic energy stored in the magnetic core of the isolating transformer generates the induced electromotive force at the secondary side, and after the induced electromotive force is rectified and filtered, it will be transmitted to the lithium battery protection circuit board 4 and the charging adapter circuit board 5. When the magnetic energy stored in the isolating transformer is released until the reverse voltage of the positive feedback coil is not enough to cut off Q2, the current flowing through the resistor R1 will re-conduct Q2, starting a new circulation. Thus, Q2 works in a switching state to make the AC/DC isolated converter circuit continuously output the isolated direct current to the following lithium battery protection circuit and the charging adapter circuit.

Protecting lithium battery: the positive terminal of the AC/DC isolated converter circuit board is connected to the positive electrode of the lithium chargeable battery, and the negative terminal is connected to the negative electrode of the lithium chargeable battery through the switch circuit U2. The positive and negative electrodes of the lithium chargeable battery are connected to the testing terminal of the circuit IC1. When voltage outputted from the AC/DC isolated converter circuit board is greater than the voltage of the lithium chargeable battery, the lithium chargeable battery can be recharged. When the voltage of the testing terminal of IC1 is greater than the predetermined voltage, U2 can be cut off by the control terminal, thus terminating recharging the lithium chargeable battery to prevent over-charge. The lithium chargeable battery can also supply power to the charging adapter circuit though U2. When the voltage of the lithium chargeable battery is smaller than the predetermined voltage of IC1, IC1 can cut off U2 through the control terminal, thus preventing the over-discharge of the lithium chargeable battery.

Charging and adapting: the PWM pulse generated from the circuit IC2 makes the field effect transistor Q3 work in the switching state. When the field effect transistor Q3 is conducted, the direct positive current supplied from the AC/DC isolated converter circuit or the lithium battery protection circuit flows through the coil L1 and the field effect transistor Q3 to the negative terminal, and the coil L1 stores magnetic energy. When the field effect transistor Q3 is cut off, the magnetic energy stored in the magnetic core of L1 is converted into the electromotive force. The electromotive force is superposed to the DC voltage supplied from the input terminal in the same direction to recharge the capacitor by the rectifier diode with a higher voltage and supply electric power to the charging adapter jack. The electric power flows through the outside load and then back to the negative terminal of the charging adapter jack. The current flows through the resistor and then back to the negative electrode of the input terminal. When the voltage of the two terminals of the charging adapter jack changes, the changing will be feedback to the voltage testing terminal of IC2 through the resistor. IC2 will change the pulse width of Q3, so as to keep the output voltage stable. When the voltage drop caused by the current flowing through the resistor and then back to the input terminal exceeds a certain predetermined value of the current testing terminal of IC2, IC2 will also change the pulse width of Q3, so as to decrease the output voltage, so that, the output current is kept at a certain predetermined value to keep the output voltage and current of the charging adapter jack at certain predetermined values, thus realizing charging and adapting.

When the commercial is available, the charging adapter of a common mobile phone can be connected to the commercial power for recharging the mobile phone, and at the same time, the chargeable battery in the recharging adapter can be recharged to store power, so that when the mobile phone is taken outside, the lithium chargeable battery in the charging adapter can be used to supply power to recharge the mobile phone. The present invention has the advantages, such as: high integration, simplified structure, portable and convenient to use.

DETAILED DESCRIPTION OF THE PREFERRED-EMBODIMENTS

The present invention will be clearer from the following description when viewed together with the accompanying drawings, which show, for purpose of illustrations only, the preferred embodiment in accordance with the present invention.

Figure 1:
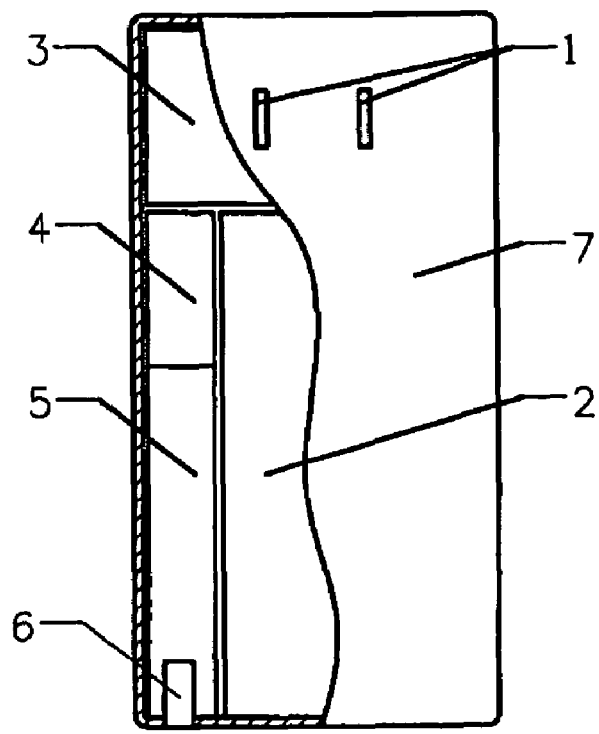
FIG. 1 is a schematic view of a charging adapter in accordance with the present invention.
Figure 2:
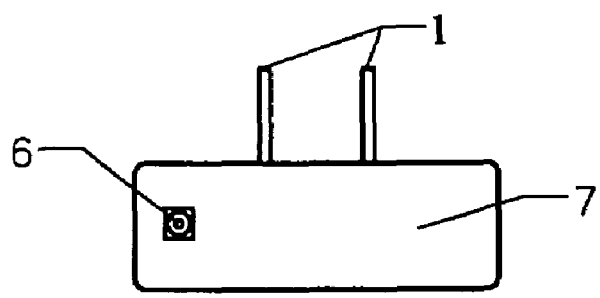
FIG. 2 is a top view of the charging adapter of FIG. 1 in accordance with the present invention.
Figure 3:
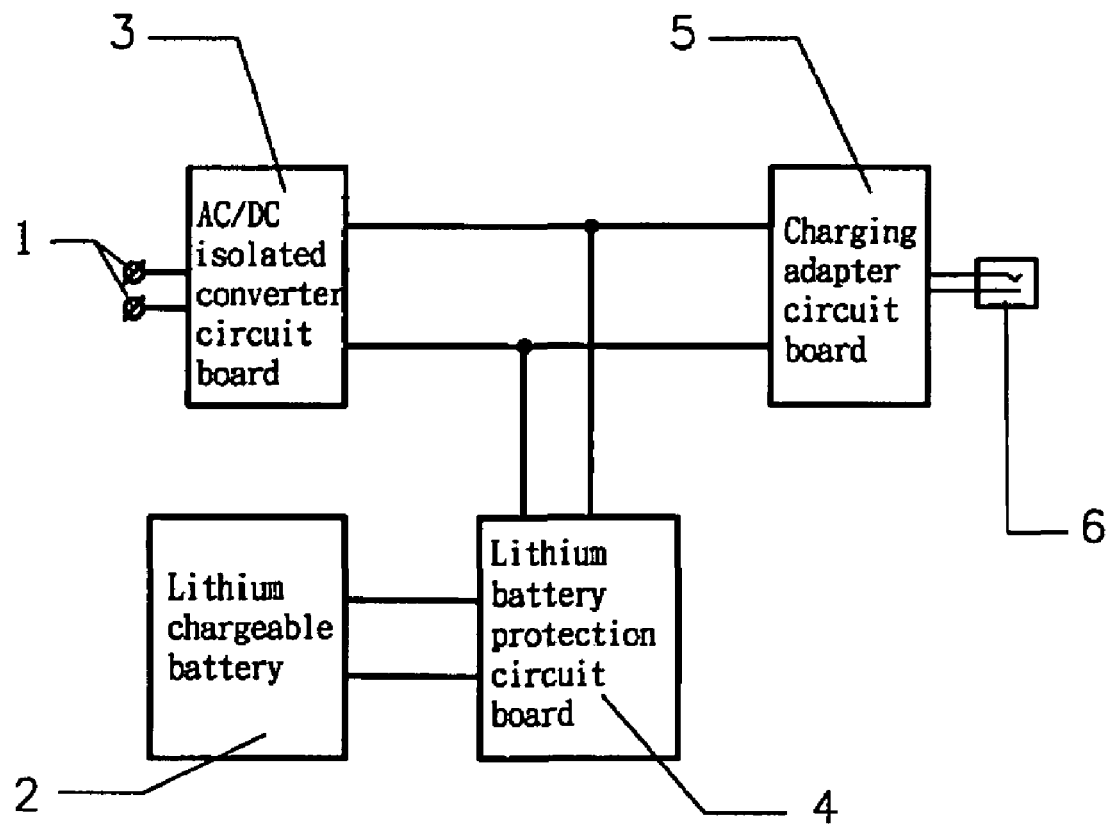
FIG. 3 is a circuitry principle block diagram of the charging adapter of FIG. 1 in accordance with the present invention.

Referring to FIGS. 1-3, an energy storage mobile charging adapter in accordance with the present invention comprises: a commercial power plug 1, an AC/DC isolated converter circuit board 3, a lithium battery protection circuit board 4, a lithium chargeable battery 2, a charging adapter circuit board 5, a charging adapter jack 6 and a plastic housing 7. The lithium chargeable battery 2 is electrically connected to the output terminals of the AC/DC isolated converter circuit board 3 and the input terminals of the charging adapter circuit board 5 through the lithium battery protection circuit board 4. The charging adapter jack 6 is electrically connected to the output terminals of the charging adapter circuit board 5. The commercial power plug 1 is electrically connected with the input terminals of the AC/DC isolated converter circuit board 3. All the above components are sealed in the plastic housing 7. When the commercial power is available, the commercial power plug 1 of the present invention is inserted into a commercial power jack to connect with the commercial power, and thus the AC commercial power is converted into the low voltage DC power by the AC/DC isolated converter circuit board 3. The output terminals of the AC/DC isolated converter circuit board 3 can recharge the lithium chargeable battery 2 through the lithium battery protection circuit board 4 as well as directly supply electric power to the charging adapter circuit board 5. The charging adapter circuit board 5 supplies power to the charging adapter plug 6 according to the predetermined current-limiting and voltage-limiting output parameters. The charging adapter jack 6 can be suitable for inserting the power plug of a mobile phone and can be electrically connected with various models of mobile phones by changing different plug wires to recharge the mobile phones. When commercial power is unavailable, the lithium chargeable battery 2 provides electric power to the charging adapter circuit board 5 through the lithium battery protection circuit board 4. As described above, the charging adapter circuit board 5 provides electric power to the charging adapter jack 6 according to the predetermined current-limiting and voltage-limiting output parameters, and the charging adapter jack 6 can be electrically connected to various models of mobile phones by changing different plug wires.

Figure 4:
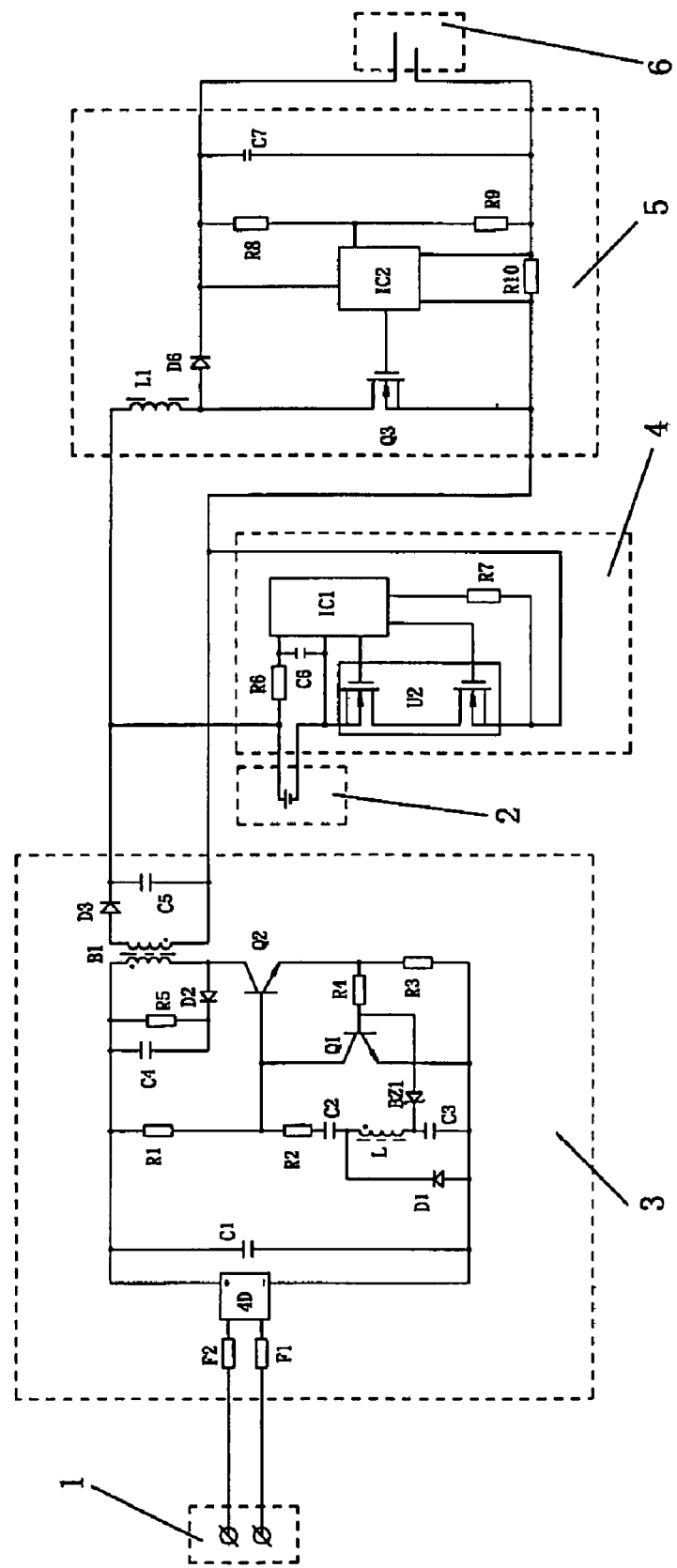
FIG. 4 is a block diagram of a switch boost circuit of FIG. 3 in accordance with the present invention.

As shown in FIG. 4, the charging adapter circuit of one embodiment in accordance with the present embodiment is a switch boost circuit. The working principle of the AC/DC isolated converter circuit board 3 is described as follows. The AC commercial power is transmitted to the input terminals (safety resistors) F1, F2 of the AC/DC isolated converter circuit board 3 through the commercial plug 1, and then is converted into DC electricity by the rectifying and filtering of 4D and C1. The positive electricity is supplied from the positive terminal to a collector of the transistor Q2 through the primary coil of an isolating transformer B1, and the current which is supplied to a base of the transistor Q2 through the resistor R1 causes the increase of the current of the collector of Q2. The current in the primary coil of B1 exponentially increases. At the same time, the positive voltage induced by the positive feedback coil L in B1 is also supplied to the base of Q2 through C3, C2, R2 and R3 to conduct Q2 more quickly. The current flowing out of the emitter of Q2 flows back to the negative terminal through the resistor R3.

When the voltage drop on R3 caused by the current is greater than the base conduction voltage of Q2, conduction of the Q1 causes the decrease of the base potential of Q2, the decrease of the current in the collector of Q2 and the primary coil of B1 and the voltage turnover of both ends of L, and further quickly accelerates the cut-off of Q2. At this moment, the magnetic energy stored in the magnetic core of B1 generates the induced electromotive force at the secondary side of B1. After being rectified and filtered by D3 and C5, the induced electromotive force is transmitted to the lithium battery protection circuit board 4 and the charging adapter circuit board 5. When the magnetic energy in B1 is released until the reverse voltage of L is not enough to cut off Q2, the current flowing through R1 conducts Q2 again to start a new circulation. Thus, Q2 works in a switching state. The AC/DC isolated converter circuit board 3 continuously outputs the isolated DC electricity to the following circuits. The working principle of the lithium battery protection circuit board 4 is described as follows. The positive terminal outputted from the AC/DC isolated converter circuit board 3 is connected to the positive electrode of the lithium chargeable battery 2, and the negative terminal is connected to the negative electrode of the lithium chargeable battery 2 through U2. The positive and negative electrodes of the lithium chargeable battery 2 are connected to the testing terminals of IC1 through R6, C6. When the output voltage of the AC/DC isolated converter circuit board 3 is greater than the voltage of the lithium chargeable battery 2, the lithium chargeable battery 2 can be recharged. When the voltage of the testing terminals is greater than the predetermined voltage, U2 can be cut off by a control terminal, thus terminating recharging the lithium chargeable battery 2 to prevent overcharge. The lithium chargeable battery 2 also can utilize U2 to supply power to the charging adapter circuit board 5. When the voltage of the lithium battery is smaller than the predetermined voltage of IC1, IC1 also can cut off U2 by means of the control terminal to prevent over-discharge of the lithium battery. The working principle of the charging adapter circuit board 5 is described as follows. This circuit is a switch boost circuit. The PWM pulse generated from IC2 makes Q3 work in a switching state. When Q3 is conducted, the DC positive electricity supplied from the AC/DC isolated converter circuit board 3 or the lithium battery protection circuit board 4 flows through L1, Q3 to the negative terminal, and L1 stores magnetic energy. When Q3 is cut off, the magnetic energy stored in the magnetic core of L1 is converted into electromotive force, and the electromotive force is superposed with the DC voltage supplied from the input terminal in the same direction to recharge C7 through the rectifier diode D6 with a higher voltage and synchronously supply power to the charging adapter jack 6. Flowing through the outside load and then back to the negative terminal of the charging adapter jack 6, the current flows back to the negative electrode of the input terminal through R8. When the voltage at the two terminals of the charging adapter jack 6 changes, the changing will be feedback to the voltage testing terminal of IC2 through R8 and R9. IC2 will change the pulse width, so as to keep the output voltage stable. When the voltage drop caused by the current flowing through the resistor R10 exceeds a certain predetermined value of the current testing terminal of IC2, IC2 will also change the pulse width of Q3, so as to decrease the output voltage, thus keeping the output current at a predetermined value. Thereby, the output voltage and the output current of the charging adapter jack can be kept at certain predetermined values, thus realizing charging and adapting.

Figure 5:
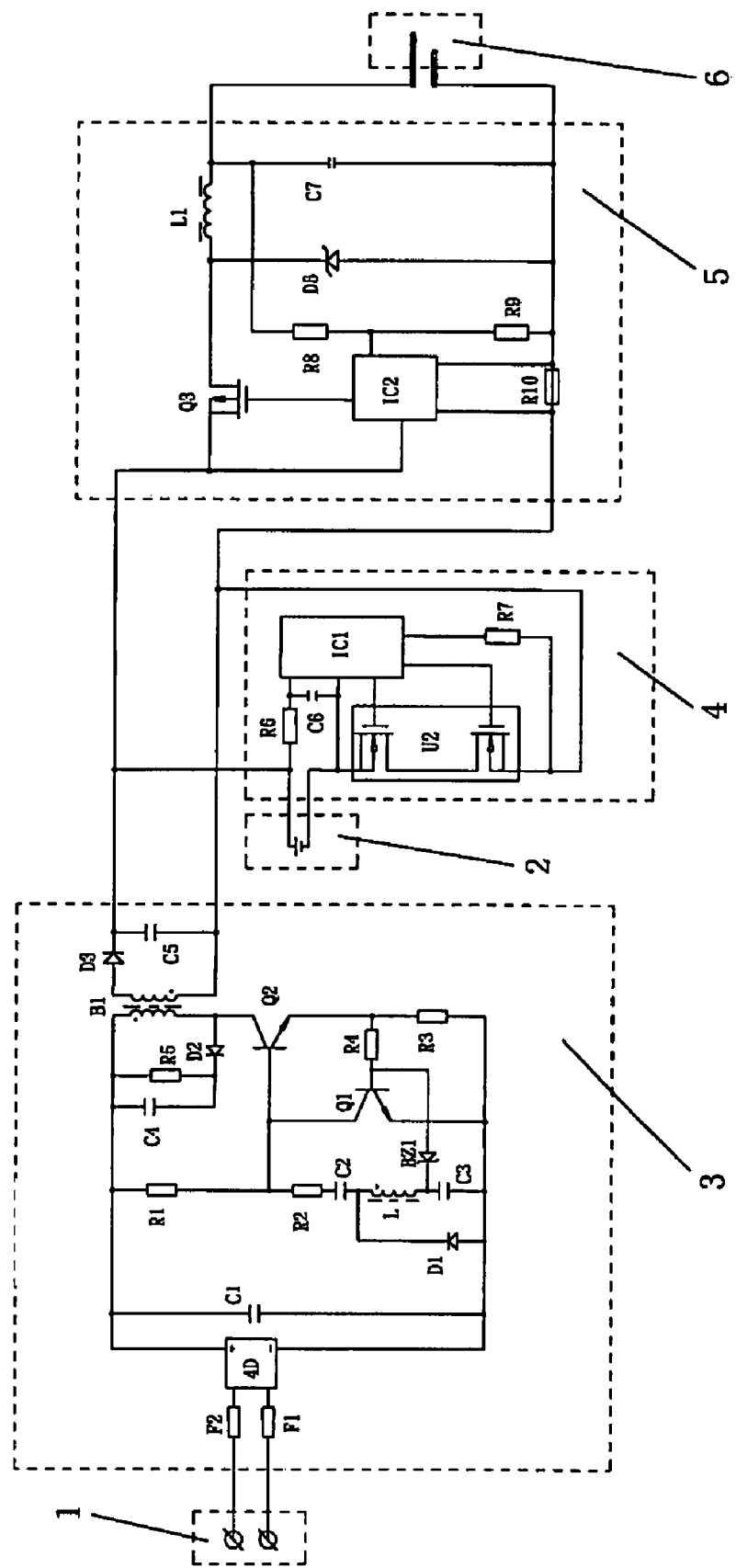
FIG. 5 is a block diagram of a switch buck circuit of FIG. 3 in accordance with the present invention.

As shown in FIG. 5, the charging adapter circuit of another embodiment in accordance with the present invention is a switch buck circuit, and other circuits are the same as the embodiment shown in FIG. 4. The working principle of the switch buck circuit is described as follows. The PWM pulse generated from IC2 makes Q3 work in a switching state. When Q3 is conducted, the DC positive electricity supplied from the AC/DC isolated converter circuit board 3 or the lithium battery protection circuit board 4 flows through Q3 and L1 to recharge C7 with a reduced voltage and to synchronously supply power to the charging adapter jack 6. At the same time, L1 stores magnetic energy. When Q3 is cut off, the magnetic energy stored in the magnetic core of L1 is converted into the electromotive force which is in the same direction as the DC voltage supplied from the original input terminal. The current flows through the rectifier diode D6 to continue recharging C7 with a reduced voltage and supply power to the charging adapter jack 6. The current which has flowed through the outside load and back to the negative terminal of the charging adapter jack 6 flows through R10 and then back to the negative electrode of the input terminal. When the voltage of the two terminals of the charging adapter 6 changes, the changing will be feedback to the voltage testing terminal of IC2 through the resistors R8 and R9. IC2 will change the pulse width of Q3 to keep the output voltage stable. When the voltage drop caused by the current flowing through the resistor R10 exceeds a certain predetermined value of the current testing terminal of IC2, IC2 also can be made to change the pulse width of Q3 to decrease the output voltage, thus keeping the output current at a certain predetermined value. Thereby, the voltage and the current which are outputted to outside by the charging adapter jack 6 are kept at certain predetermined values, thus realizing charging and adapting.

While we have shown and described various embodiments in accordance with the present invention, it is clear to those skilled in the art that further embodiments may be made without departing from the scope of the present invention.

What is claimed is:

1. An energy storage mobile charging adapter comprising: a plastic housing, an AC/DC isolated converter circuit board (3) and a charging adapter circuit board (5); wherein output terminals of the AC/DC isolated converter circuit board (3) are connected with input terminals of the charging adapter circuit board (5), a commercial plug (1) is connected with input terminals of the AC/DC isolated converter circuit board (3), the energy storage mobile charging adapter is characterized in that: a lithium chargeable battery (2) is electrically connected to the output terminals of the AC/DC isolated converter circuit board (3) and the input terminals of the charging adapter circuit board (5), and the charging adapter plug (6) is electrically connected to output terminals of the charging adapter circuit board (5); and the energy storage mobile charging adapter is characterized in that, in the AC/DC isolated converter circuit board (3), a commercial power flows through safety resistors (F1), (F2), and a rectifier and a filter (4D) and (C1) and then is divided into two routes, one route is connected a collector of a transistor (Q2) through a primary coil of an isolating transformer (B1), the other route is connected to a base of the transistor (Q2) through a resistor (R1), a positive feedback coil in the isolating transformer (B1) is connected to the base of the transistor (Q2) through a capacitor (C3), a capacitor (C2), a resistor (R2) and a resistor (R3), a secondary coil of the isolating transformer (B1), an induced current of a secondary coil of the isolating transformer (B1) is outputted though a rectifier and a filter (D3) and (C5).

2. The energy storage mobile charging adapter as claimed in claim 1, characterized in that, in a lithium battery protection circuit board (4), a positive electrode and a negative electrode of the lithium chargeable battery (2) are connected to testing terminals of a circuit (IC1), a control terminal of the circuit (IC1) is connected to the negative electrode of the lithium chargeable battery (2) through a switch circuit (U2) the positive electrode of the lithium chargeable battery (2) is connected to an output positive electric terminal of the circuit board (2), and the negative electrode of the lithium chargeable battery (2) is connected to an output negative terminal of the circuit board (3).

3. The energy storage mobile charging adapter as claimed in claim 1, characterized in that, in the charging adapter circuit board (5), a PWM control terminal of an integrated circuit (IC2) is connected to a gate of a field effect transistor (Q3), a drain of the field effect transistor (Q3) is connected to output positive terminals of the circuit board (3) and a circuit board (4) through a coil (L1) and is connected to a positive terminal of the charging adapter jack (6) through a rectifier diode (D6), the coil (L1) and a capacitor (C7), a voltage testing terminal of the circuit (IC2) is cross-connected to the charging adapter jack (6) through resistors (R8), (R9) and the capacitor (C7), a current testing terminal of the circuit (IC2) is connected to a negative terminal of the charging adapter jack (6) through a resistor (R10).

4. The energy storage mobile charging adapter as claimed in claim 1, characterized in that, in the charging adapter circuit board (5), a PWM control terminal of an integrated circuit (IC2) is connected to the gate of a field effect transistor (Q3), a source of the field effect transistor (Q3) is connected to the output positive terminals of the circuit board (3) and a circuit board (4), the drain of the field effect transistor (Q3) is connected to the positive terminal of the charging adapter jack (6) through a coil (L1) and a capacitor (C7), a positive electrode of a rectifier diode (D6) is connected to the coil (L1) and the drain of the field effect diode (Q3), and a negative electrode of the rectifier (D6) is connected to the negative terminal of the charging adapter jack (6), the voltage testing terminal of the circuit (IC2) is cross-connected to the charging adapter jack (6) through resistors (R8), (R9) and the capacitor (C7), a current testing terminal of the circuit (IC2) is connected to the negative terminal of the charging adapter jack (6) through a resistor (R10).

* * * * *